United States Patent Office.

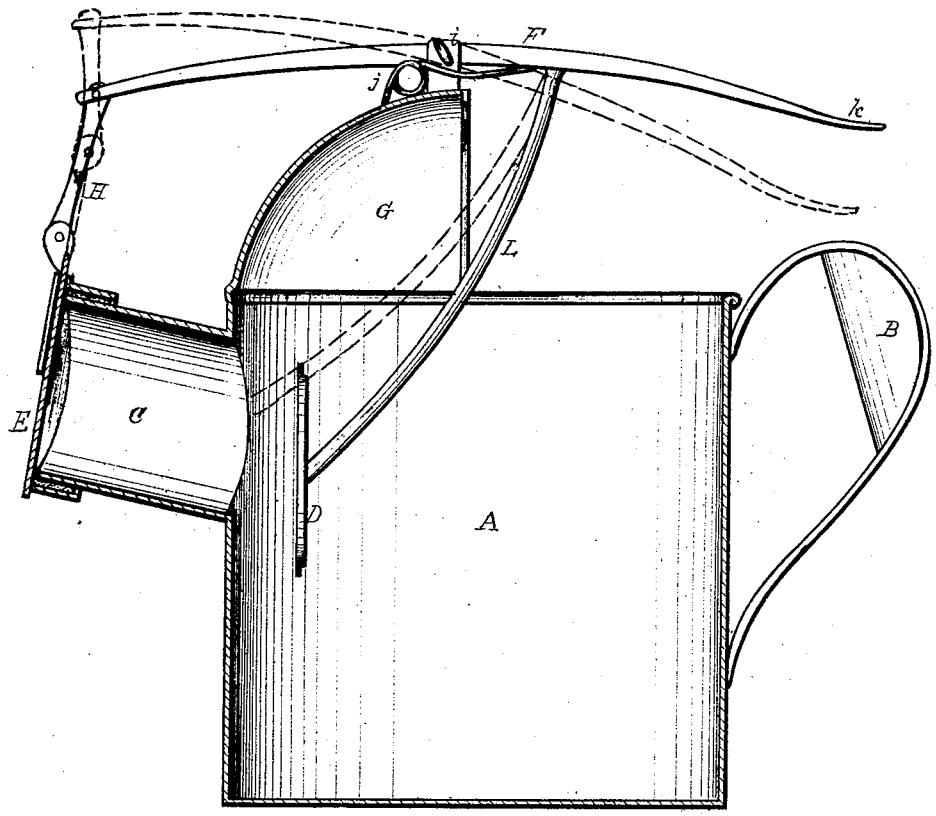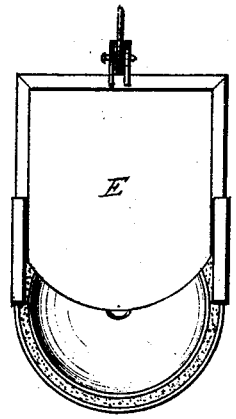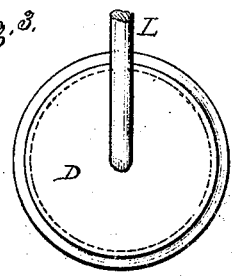

EDWIN A. JEFFERY, OF NEW YORK, N. Y.

Letters Patent No. 111,548, dated February 7, 1871.

IMPROVEMENT IN BATTER-POTS.

The Schedule referred to in these Letters Patent and making part of the same.

I, EDWIN A. JEFFERY, of the city of New York, in the county and State of New York, have invented an Improved Batter-Pot, of which the following is a specification.

The object of my invention is to provide an apparatus which will enable the cook to place upon the griddle, or other appropriate utensil for the purpose, the requisite quantity of batter for a single cake, and repeat the quantity uniformly without the use of a spoon or other measure; and It consists in the combination, with the spout of said vessel, of a valve or valves, the office of which is to shut off the supply from the pot, while the batter for one cake is being poured on the griddle, and immediately allow another charge to enter the spout, the operation being repeated automatically, by pressure upon a thumb-lever, as often as required.

Figure 1 is a central vertical section;

Figure 2 is a detached view of the closing-gate or valve at the discharge-end of the spout; and Figure 3 is a detached view of the valve at the entrance of the spout.

The body of the pot may consist of a vessel, A, of any suitable shape, with a handle, B, preferably attached at the side.

On one side (preferably that opposite to the handle,) is situated an extension, C, of a size large enough to contain batter enough for one cake.

This opens internally so as to be filled from the pot, and externally to form a spout, both openings being provided with valves, D E, so arranged that the opening of one closes the other, so that only one can be opened at the same time.

Both valves are operated by the spring-lever F, which has its axis in a bearing at the top of the arched half-cover G.

Its forward arm is jointed by the intermediate connecting-rod H to the slide-valve or closing-gate E, and a spring, $j$, acts upon the lever so as to hold the gate down and keep the mouth closed.

A rigid arm, L, attached to the other arm of the lever, carries the valve D, holding it in a position which leaves open communication between the interior of the pot and the spout or chamber C when the valve E is closed, and *vice versa*.

The operation is as follows:

The pot being held by the handle B, and inclined as in the act of pouring the batter enters the chamber C filling it.

The end $k$ of the thumb-lever F is then depressed, as shown in dotted lines, simultaneously closing valve D and opening gate E, by which the batter in chamber C is discharged on the griddle.

The lever being released the force of the spring $j$ returns it to its former position, in which the gate E is closed and valve D opened, allowing the chamber to fill again.

The operation is instantaneous, requiring only the movement of the thumb to depress the lever F, and securing the deposit each time by an exactly uniform measure of the batter, insuring uniformity and regularity of size and shape in the cakes.

The valves D E may be made of any form or kind that will insure their opening and closing simultaneously, and may be packed or otherwise made tight.

The gate E should close tightly enough to prevent the dripping of the batter.

The lever and valves are all connected together, and, by removing the pin $i$ which forms the axis, all may be removed from the pot or can to facilitate their cleansing.

Not only is it adapted for griddle-cakes, but for muffins, waffles, fritters, &c., and all cakes made from batter.

It is convenient, cleanly, and economical, and it saves time and prevents waste.

I claim—

1. The combination, with a batter-pot, of an auxiliary chamber C to contain the precise quantity of batter for each cake, when provided with the means of opening and closing communication between the two, substantially as set forth.

2. The spring-lever F and valves D and E, in combination with a spout or chamber, C, and pot A, substantially as and for the purposes set forth.

EDWIN A. JEFFERY.

Witnesses:
KATE N. JONES,
WHEELER W. PHILLIPS.